United States Patent [19]
Fairley et al.

[11] 3,903,306
[45] Sept. 2, 1975

[54] FERMENTATION OF TEA

[75] Inventors: Charles John Fairley, Alton;
Derwent Swaine, Caversham, both
of England

[73] Assignee: Tenco Brooke Bond Limited,
England

[22] Filed: May 9, 1974

[21] Appl. No.: 468,345

Related U.S. Application Data

[63] Continuation-in-part of Ser. No. 232,948, March 8, 1972, abandoned.

[30] Foreign Application Priority Data

Mar. 9, 1971 United Kingdom................ 6405/71

[52] U.S. Cl.................................. 426/49; 426/193
[51] Int. Cl.²........................................... A23F 3/00
[58] Field of Search ............ 426/49, 435, 193, 365, 426/366

[56] References Cited
UNITED STATES PATENTS

| 3,108,877 | 10/1963 | Cooper............................. | 426/435 |
| 3,151,985 | 10/1964 | Fobes................................ | 426/435 |
| 3,163,539 | 12/1964 | Barch............................... | 426/435 |
| 3,484,248 | 12/1969 | Graham et al..................... | 426/366 |
| 3,649,297 | 3/1972 | Millin................................ | 426/49 |

Primary Examiner—Frank W. Lutter
Assistant Examiner—Steven L. Weinstein
Attorney, Agent, or Firm—Robert A. Lester; John R. Martin; W. Dexter Brooks

[57] ABSTRACT

Process for preparing a cold-water soluble instant tea composition by disintegrating and forming an aqueous suspension of green tea leaf, including natural enzymes; initiating at a pH of about 4.3–5.6 and a temperature of about 5°–30°C an enzymatic reaction by adding hydrogen peroxide solution to the suspension at a controlled rate of flow while monitoring the concentration of dissolved molecular oxygen in the suspension, the rate of flow being adjusted to give an initial concentration of dissolved molecular oxygen in the suspension of about 1–10 percent of air saturation; allowing the reaction to take place while the concentration of dissolved molecular oxygen remains fairly constant, stopping the addition of hydrogen peroxide solution when a sudden rise in the concentration of dissolved molecular oxygen occurs, eliminating further enzyme activity, removing insoluble tea leaf material and subsequently drying the resultant liquor.

7 Claims, No Drawings

3,903,306

FERMENTATION OF TEA

CROSS-REFERENCE TO RELATED APPLICATION

This application is a continuation-in-part of U.S. Pat. application Ser. No. 232,948, filed Mar. 8, 1972, now abandoned.

BACKGROUND OF THE INVENTION

A number of prior processes are known for the production of cold-water soluble tea. These prior processes usually involve removing solids that are insoluble at cold temperatures (such insoluble solids being referred to in the art as tea cream) by centrifugation, treating the tea cream by various chemical methods to render it soluble and adding the tea cream back to the clear supernatant liquor. Such methods usually have been fairly drastic and the final product usually had very little fresh tea character.

U.S. Pat. No. 3,649,297 describes a process for preparing an instant tea composition that comprises disintegrating green leaf, mixing the disintegrated green leaf with water in a fermentation vessel having an inlet for introducing gas into the resulting suspension and an outlet for venting emitted volatile substances from the vessel, stirring the suspension, introducing an oxygen-containing gas into the suspension at a controlled rate of gas flow and with stirring adjusted to give a minimum concentration of dissolved oxygen of 10 percent of air saturation, allowing fermentation to take place while the concentration of dissolved oxygen remains at the desired level, determining the optimum fermentation time by monitoring an increase in the level of dissolved oxygen in the suspension, removing insoluble materials, eliminating further enzyme activity upon completion of the desired fermentation, either after or before removal of insoluble materials and subsequently drying the final liquor. Hydrogen peroxide may be added to the suspension during the process to give added control over the appearance of the product.

U.S. Pat. No. 3,151,985 describes the use of hydrogen peroxide as a suitable oxidizing agent to solubilize tea tannins. Hydrogen peroxide also may be used to bleach the oxidized tea tannins, thereby restoring at least part of the original tea color.

SUMMARY OF THE INVENTION

In accordance with the present invention there is provided a process for the preparation of a cold-water soluble instant tea composition that comprises disintegrating green tea leaf, including natural enzymes, forming an aqueous suspension by mixing the disintegrated green tea leaf with water in a suitable fermentation vessel, initiating at a pH of about 4.3–5.6 and a temperature of about 5°–30°C, preferably about 15°–25°C, an enzymatic reaction by adding hydrogen peroxide solution to the suspension at a controlled rate of flow while monitoring the concentration of dissolved molecular oxygen in the suspension, said rate of flow being adjusted to give initial concentration of dissolved molecular oxygen in the suspension of about 1–10 percent, preferably about 2–4 percent, allowing fermentation to take place while the concentration of dissolved molecular oxygen remains at said concentration, stopping the addition of hydrogen peroxide solution when a sudden rise in the concentration of dissolved molecular oxygen occurs, eliminating further enzyme activity, removing insoluble tea leaf material and subsequently drying the resultant liquor.

Preferably, the resultant liquor is dried by spray drying or freeze drying. In a preferred embodiment, the resultant liquor is cooled to about 7°C after removing the insoluble tea leaf material and held at that temperature for about 1 hour before centrifuging clear.

The present invention also is directed to an instant tea composition prepared by the process described in the preceeding paragraph.

DETAILED DESCRIPTION

The process exemplified and embodied herein provides a cold-water soluble instant tea composition of pleasing appearance and exhibiting a fresh tea flavor through the steps of:

1. disintegrating green tea leaf, including natural enzymes,
2. forming an aqueous suspension by mixing the disintegrated leaf with water in a suitable fermentation vessel,
3. initiating an enzymatic reaction by adding hydrogen peroxide solution to the suspension at a controlled rate of flow while monitoring the concentration of dissolved molecular oxygen in the suspension,
4. allowing fermentation to take place so long as the concentration of dissolved molecular oxygen remains relatively constant,
5. stopping the addition of hydrogen peroxide solution when a sudden rise in the concentration of dissolved molecular oxygen occurs,
6. eliminating further enzyme activity,
7. removing insoluble tea leaf material and
8. subsequently drying the resultant liquor. Upon completion of the enzymatic reaction the concentration of the tea components in the liquor may be adjusted by admixing the liquor from the reaction with liquor obtained from another source.

During the enzymatic reaction of the present invention, the peroxidase naturally present in tea leaf substrates catalyzes a peroxidation reaction. Unexpectedly, the basic peroxidase-catalyzed reaction does not involve the breakdown of hydrogen peroxide into molecular oxygen as a preliminary step to oxidation. From the literature, the mechanism of the reaction appears to be based on the formation of enzyme-hydrogen donor complexes coupled with two univalent oxidation steps. See Gerald Reed, Enzymes in Food Processing, pp. 185 and 6, Academic Press, New York (1966). Through this reaction the hydrogen peroxide acts directly on tea leaf substrates until the reactive components of the substrates, mainly catechins, have been oxidized.

A secondary competing reaction involves the enzyme catalase which breaks down hydrogen peroxide to release molecular oxygen. It is this side reaction which permits one to determine the condition of the peroxidase reaction by monitoring the molecular oxygen content of the suspension. When the catechins have been used up, this reaction predominates to release increased amounts of molecular oxygen. The end of the peroxidase-catalyzed reaction thus is characterized by a smooth rise in dissolved oxygen concentration somewhat similar to that observed in the fermentation process of Millin, U.S. Pat. No. 3,649,297. For observation of the oxygen concentration, an oxygen-measuring device may be placed in the fermentation vessel.

The hydrogen peroxide preferably is added to the suspension at a rate of flow adjusted to give an initial concentration of dissolved molecular oxygen in the suspension of about 1–10 percent, most preferably about 2–4 percent. This concentration is expressed in terms of percentage of air saturation. 100 percent of air saturation represents the partial pressure of oxygen in water saturated with air under standard conditions of temperature and pressure, and is equivalent to an oxygen partial pressure at 20°C of 152 mm. of Hg.

The pH of the enzymatic reaction is most suitably between about 4.3 and 5.6. Preferably, the initial pH of the suspension is set, for example by the addition of sodium hydroxide or phosphoric acid, and the reaction allowed to proceed without further adjustments. However, if desired, the pH may be continuously monitored and controlled to insure constancy.

Preferably, the enzymatic reaction is carried out at a temperature between about 5° and 30°C. Above the 30°C figure, the resulting tea product, particularly its color, is very poor. Below 5°C, although the product might be acceptable, the rate of reaction is too slow for economical production. For best results, the temperature of the reaction is between about 15° and 25°C.

When the rise in dissolved oxygen concentration is observed, the addition of hydrogen peroxide solution is stopped and the enzymes inactivated. After removal of insoluble leaf tea material, the extract is preferably cooled to about 7°C, held 1 hour at this temperature, and then centrifuged clear. The extract is dried, e.g. by spray or freeze drying, after concentration and addition of volatiles as in the Millin process.

The extract contains compounds similar to those produced by normal fermentations with oxygen, but the proportion of high to low molecular weight materials is considerably higher. Due to a much greater production of highly colored polymeric material by the new process, the color of the extract is considerably darker than with prior processes. However, when the insoluble materials have been removed, the color of the extract is of normal intensity. Significantly less "cream" is formed, and it has been found that even the cream which is removed can be successfully incorporated into a normal hot-water soluble product or solubilized by known processes and incorporated into a cold-water soluble product. The solubilization of tea cream utilizing an enzyme preparation is described and claimed in British Pat. specification No. 1,249,932. Additionally, at this point it might be noted that the cold-water soluble instant tea of the invention also may be used as a hot beverage.

The following Examples illustrate specific embodiments of the invention and manners by which it may be put into effect.

EXAMPLE 1

Minced or cut withered tea (1250 g.) was suspended in water (6500 ml.) in a 12-litre glass vessel and the slurry stirred by a stainless steel stirrer driven by a variable speed motor. A dissolved oxygen meter (Model 15A, Electronic Instrument Limited) as described in Millin U.S. Pat. No. 3,649,297 was employed. Hydrogen peroxide solution (40 vol. grade; 3.6M) was added at a controlled rate of 3.5 ml./min. to the slurry until a sudden rise in the concentration of dissolved oxygen was noted. The reaction was carried out at a temperature of about 25°–28°C and a pH of about 4.6. Fermentation was judged complete when the concentration of dissolved oxygen reached 50 percent of air saturation. The slurry was then heated to boiling, simmered for 20 minutes and coarse leaf debris removed in a basket centrifuge. The partially clarified extract was cooled to 10°C, allowed to stand for 1 hour at this temperature and centrifuged clear. The dilute extract was concentrated to 15 percent solids concentration. Volatile material removed during the evaporation was recovered and added to the liquor before freeze drying. The instant tea was completely clear when dissolved at beverage concentration in distilled water at 7°C and the solution had excellent appearance and tea flavor. It was also excellent as a hot-water beverage.

The pH of the clarified extract may be adjusted if desired with a suitable reagent before evaporation.

EXAMPLE 2

With all other conditions being the same, three teas were prepared in accordance with the invention by carrying out enzymatic reactions at a pH of about 4.6 at 9°C, 20°C and 32°C.

There was virtually no difference in taste or appearance of the teas prepared at 9°C and 20°C. The tea prepared at 32°C, however, was poor by comparison, in particular being very dull in color. This was borne out by an examination of the absorption spectra as shown in the following table:

| Temperature of reaction | $\frac{450*}{550}$ ratio |
|---|---|
| 9 | 3.16 |
| 20 | 3.20 |
| 32 | 2.60 |

*The absorbance ratio 450/550 measures the ratio of theaflavin/non-dialysable material. It is considered to be a fairly reliable and useful indication of the quality of a tea; a higher value is indicative of a higher quality. See, for example, Millin, D.J. et al, Some Effects of Ageing on Pigments of Tea Extracts, J. Sci. Fd. Agric., Vol. 20, May 1969.

EXAMPLE 3

Using varying pH's as shown in the following table, enzymatic reactions were carried out at 25°C according to the invention with 200g. of fresh macerated tea leaves being added to 1400 ml. of water. The pH of each suspension before addition of peroxide was altered by adding NaOH or $H_3PO_4$ as appropriate. Although pH control was not exercised during the reaction there was little change in the values observed. All final solutions were adjusted to pH 5.4 before absorption spectra were recorded.

| Ref. no. | Fermentation pH start | Fermentation pH finish | mls $H_2O$ used | Reaction time | $\frac{450}{550}$ |
|---|---|---|---|---|---|
| 4 | 6.5 | 6.5 | 42 | 14 | 2.68 |
| 3 | 5.9 | 5.9 | 48 | 16 | 2.80 |
| *1 | 5.6 | 5.4 | 45 | 15 | 3.00 |
| 2 | 5.1 | 4.9 | 46 | 15.5 | 3.33 |
| 5 | 4.4 | 4.3 | 52 | 17.5 | 3.13 |

*Control Value

For producing a cold-water soluble tea, the most desirable color is a reddish hue. From work done on aging of tea extracts, it was established that the 450/550 value decreases considerably as tea deteriorates. This reflects (in the normal brew situation) a loss of theaflavin pigments and a formation of polymeric material leading to reddish brown and (ultimately) brown solutions.

It is believed that the present invention, its mode of operation and the advantages attendant thereto, should be readily understood from the foregoing description. While various preferred embodiments and examples of the invention have been shown and described for illustrative purposes, the details thereof are nevertheless capable of wide variation within the purview of the invention as defined in the appended claims.

We claim:

1. A process for the preparation of a cold-water soluble instant tea composition that comprises disintegrating green tea leaf which includes its natural enzymes, forming an aqueous suspension by mixing the disintegrated green tea leaf with water in a suitable fermentation vessel, initiating at a pH of about 4.3–5.6 and a temperature of about 5°–30°C an enzymatic reaction by adding a reaction initiating agent consisting essentially of hydrogen peroxide solution to the suspension at a controlled rate of flow while monitoring the concentration of dissolved molecular oxygen in the suspension, said rate of flow being adjusted to give an initial concentration of dissolved molecular oxygen in the suspension of about 1–10 percent of air saturation, allowing fermentation to take place while the concentration of dissolved molecular oxygen remains at said concentration, stopping the addition of hydrogen peroxide solution when a sudden rise in the concentration of dissolved molecular oxygen occurs, eliminating further enzyme activity, removing insoluble tea leaf material and subsequently drying the resultant liquor.

2. A process according to claim 1 wherein said temperature is about 15°–25°C.

3. A process according to claim 1 which comprises adding the hydrogen peroxide solution to the suspension at a rate of flow adjusted to give an initial concentration of dissolved molecular oxygen in the suspension of about 2–4 percent of air saturation.

4. A process according to claim 1 which comprises drying the resultant liquor by spray drying.

5. A process according to claim 1 which comprises drying the resultant liquor by freeze drying.

6. A process according to claim 1 which comprises cooling the resultant liquor to about 7°C after removing insoluble tea leaf material and holding the liquor at that temperature for about 1 hour before centrifuging clear.

7. An instant tea composition prepared by the process of claim 1.

* * * * *